United States Patent
Yeh et al.

(10) Patent No.: US 6,846,113 B2
(45) Date of Patent: Jan. 25, 2005

(54) PACKAGING FOR HIGH POWER PUMP LASER MODULES

(75) Inventors: Xian-Li Yeh, Walnut, CA (US); Gang Paul Chen, Walnut, CA (US)

(73) Assignee: Archcom Technology, Inc.

( * ) Notice: Subject to any disclaimer, the term of this patent is extended or adjusted under 35 U.S.C. 154(b) by 0 days.

(21) Appl. No.: 10/438,411

(22) Filed: May 15, 2003

(65) Prior Publication Data

US 2003/0215193 A1 Nov. 20, 2003

Related U.S. Application Data

(60) Provisional application No. 60/381,636, filed on May 17, 2002.

(51) Int. Cl.[7] .................................................. H04N 5/95
(52) U.S. Cl. .............................. 385/88; 385/90; 385/91
(58) Field of Search ............................. 385/88, 89, 90, 385/91, 92, 93, 94

(56) References Cited

U.S. PATENT DOCUMENTS

| | | | |
|---|---|---|---|
| 4,186,994 A | * | 2/1980 | Denkin et al. ................ 385/90 |
| 4,798,439 A | * | 1/1989 | Preston ........................ 385/91 |
| 4,807,956 A | * | 2/1989 | Tournereau et al. .......... 385/91 |
| 4,844,581 A | * | 7/1989 | Turner ......................... 385/91 |
| 5,307,434 A | * | 4/1994 | Blonder et al. ............... 385/91 |
| 6,536,958 B2 | * | 3/2003 | Liu .............................. 385/92 |
| 6,690,865 B2 | * | 2/2004 | Miyazaki ...................... 385/52 |
| 2002/0037142 A1 | * | 3/2002 | Rossi ........................... 385/92 |
| 2003/0095759 A1 | * | 5/2003 | Dautartas et al. ............ 385/92 |
| 2004/0037519 A1 | * | 2/2004 | Kilian .......................... 385/94 |

* cited by examiner

*Primary Examiner*—William H. Mayo, III
(74) *Attorney, Agent, or Firm*—Fulbright & Jaworski LLP

(57) ABSTRACT

Locally heated low temperature solder glass is used to permanently fix an optical fiber with sub-micron precision to a glass ceramic submount inside a high power pump laser module. The fiber is manipulated into a predetermined alignment while the solder glass is still molten and the solder glass is then cooled to its solidified state. The predetermined alignment may include an offset to compensate for subsequent thermally related dimensional changes as the solder glass cools and solidifies. If necessary, the solder glass can be remelted and the fiber realigned with a different offset if the first alignment attempt is less than optimal. This alignment process has been demonstrated to provide reliable and efficient coupling of an optical fiber to a high power pump laser within very tight tolerances. A similar process can also be applied to other micro-optics assemblies where high precision, high reliability fiber fixing is required.

5 Claims, 3 Drawing Sheets

PACKAGING FOR HIGH POWER PUMP LASER MODULES

CROSS REFERENCE TO RELATED APPLICATIONS

This application is based on, and claims priority from, our like-named U.S. Provisional Application 60/381,636 filed on 17 May 2002.

BACKGROUND

High reliability is generally required for laser diodes, such as pump lasers and signal lasers, used in fiber-optic communication. Packaging these lasers typically involves the following steps: fixing the laser and other parts in an enclosure; having optics to couple the light from the laser chip to an optical fiber; and sealing the enclosure hermetically. Pump laser modules, which nowadays have hundreds of mW fiber-coupled optical power, are the key components in erbium doped fiber amplifiers. Because of the high power output, packaging pump laser modules is more challenging in both the package design and process as compared to those for the low power lasers.

Figure 1:
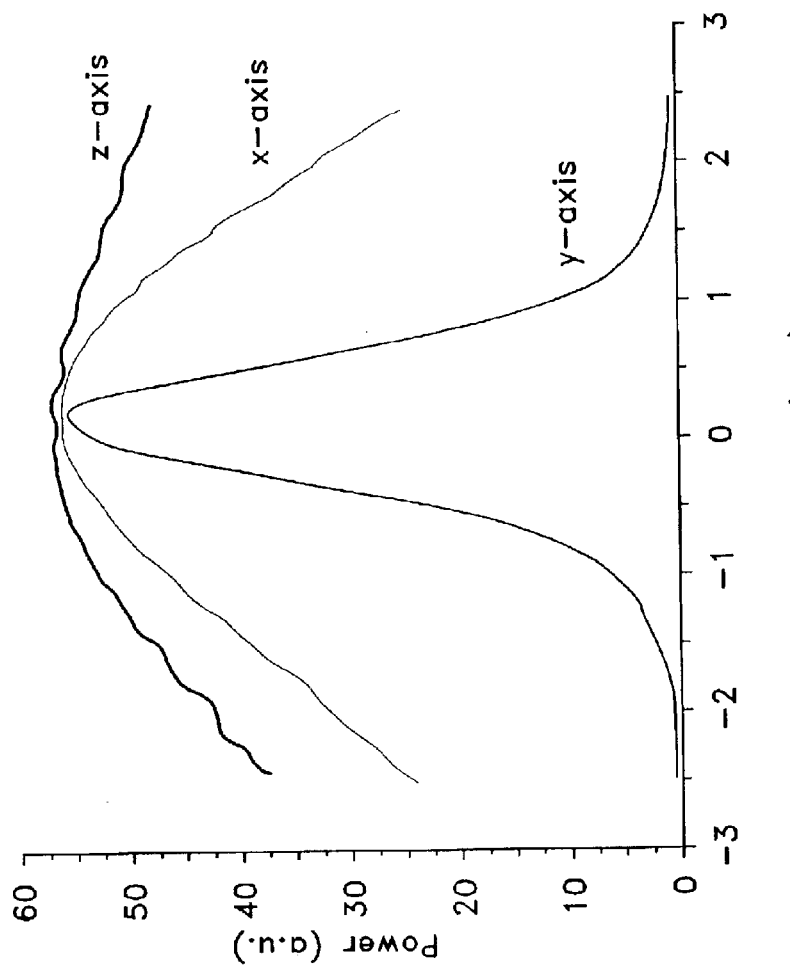

One of the major challenges in packaging of high power output fiberoptic components is the tight tolerance in fiber alignment (FIG. 1). The laser beam emitted from the laser chip 10 (FIG. 2) is elliptical with an aspect ratio of about 3:1. In order to maximize the power coupling from the chip to the single-mode optical fiber 12, a wedge-shape lensed fiber is commonly used, the end 14 of which acts as a micro cylindrical lens to convert the elliptical beam into a circular one. Coupling efficiency of 70% or higher is readily achievable by using lensed fibers. Both optical modeling and actual measurement indicate (as shown in FIG. 1) that to stay within 90% of the peak coupling efficiency, the translation tolerance (x and z-axes, see FIG. 2) of fiber to chip alignment is on the order of micrometer; and in the vertical direction (y-axis) the tolerance is even reduced to sub-micrometer.

In addition to the tight tolerance, it is also required that the high-power fiber optic package is free from any contamination, including outgassing, of organic materials. Such a contamination could be laser dissociated into carbon particles, which then deposit onto the laser facet. The contamination will, therefore, degrade the laser performance and could eventually cause catastrophic optical damage to the laser chip.

Laser welding has been used in packaging pump laser modules for many years and has been proven as a reliable and clean process. In this process, the lensed fiber is assembled in a metal ferrule and a special designed metal clip is needed for welding the fiber to a metal base. Because the laser welding process inevitably introduces some local stress on the welding spot and hence, shifts the fiber out of alignment, one has to anneal the laser module to relax the excessive stress and then bring the fiber back into alignment by "hammering" which means to physically deform the metal parts. The annealing/hammering process could take several iterations before the fiber is stabilized in alignment.

Low temperature solder glasses (also known as frits) are proven materials and are widely used in opto-electronic packages as hermetic sealing compounds for feed-through pins, optical windows and lenses. Solder glass starts in a form of powder or preforms and is processed at high temperature that ranges from 350° C. to 700° C., depending on the specific composition. It is non-creeping, clean and stable over the temperature range that laser modules are specified.

SUMMARY OF INVENTION

In one embodiment, locally heated low temperature solder glass is used to permanently fix an optical fiber with sub-micron precision inside a high power pump laser module. The fiber is manipulated into a predetermined alignment while the solder glass is still molten and the solder glass is then cooled to its solidified state. Preferably, the alignment process involves monitoring of the laser power coupled to the fiber and the predetermined alignment includes an offset to compensate for subsequent thermally related dimensional changes as the solder glass solidifies. If necessary, the solder glass can be remelted and the fiber realigned with a different offset if the first alignment attempt is less than optimal. This alignment process has been demonstrated to provide reliable and efficient coupling of an optical fiber to a high power pump laser within very tight tolerances. A similar process can also be applied to other micro-optics assemblies where high precision, high reliability fiber fixing is required.

FIGURES

Figure 2:
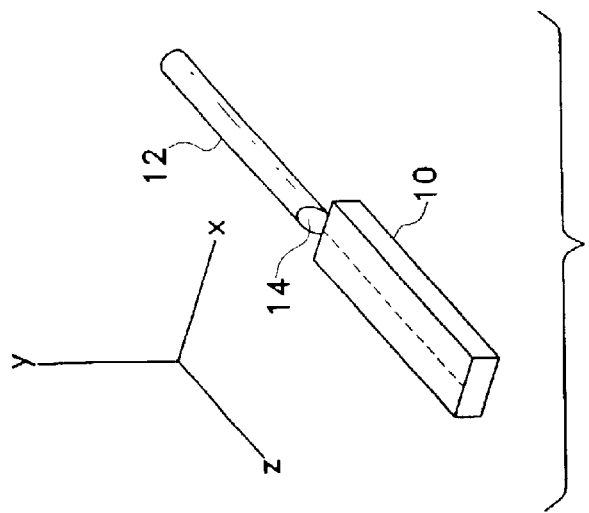
Figure 3:
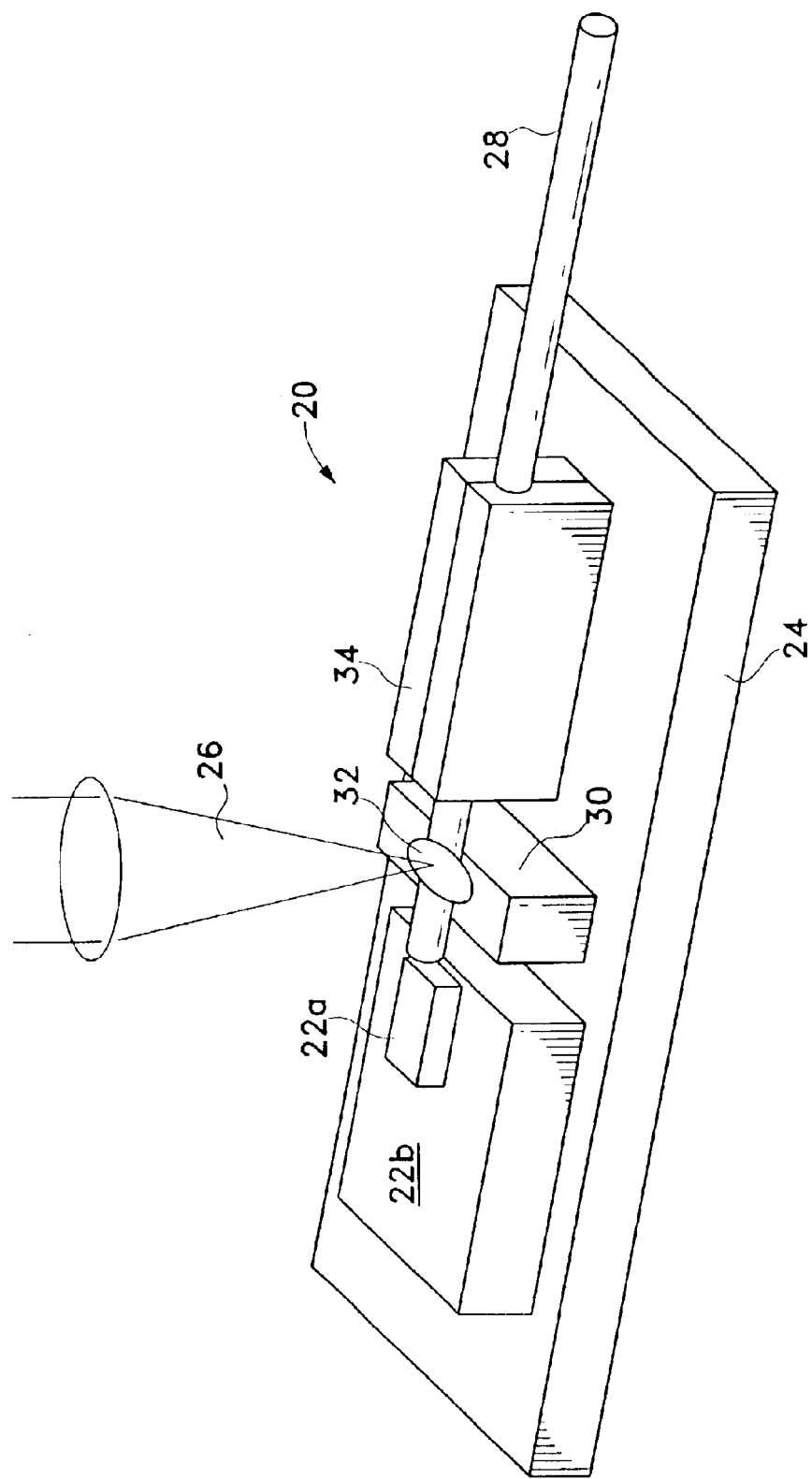
Figure 4:
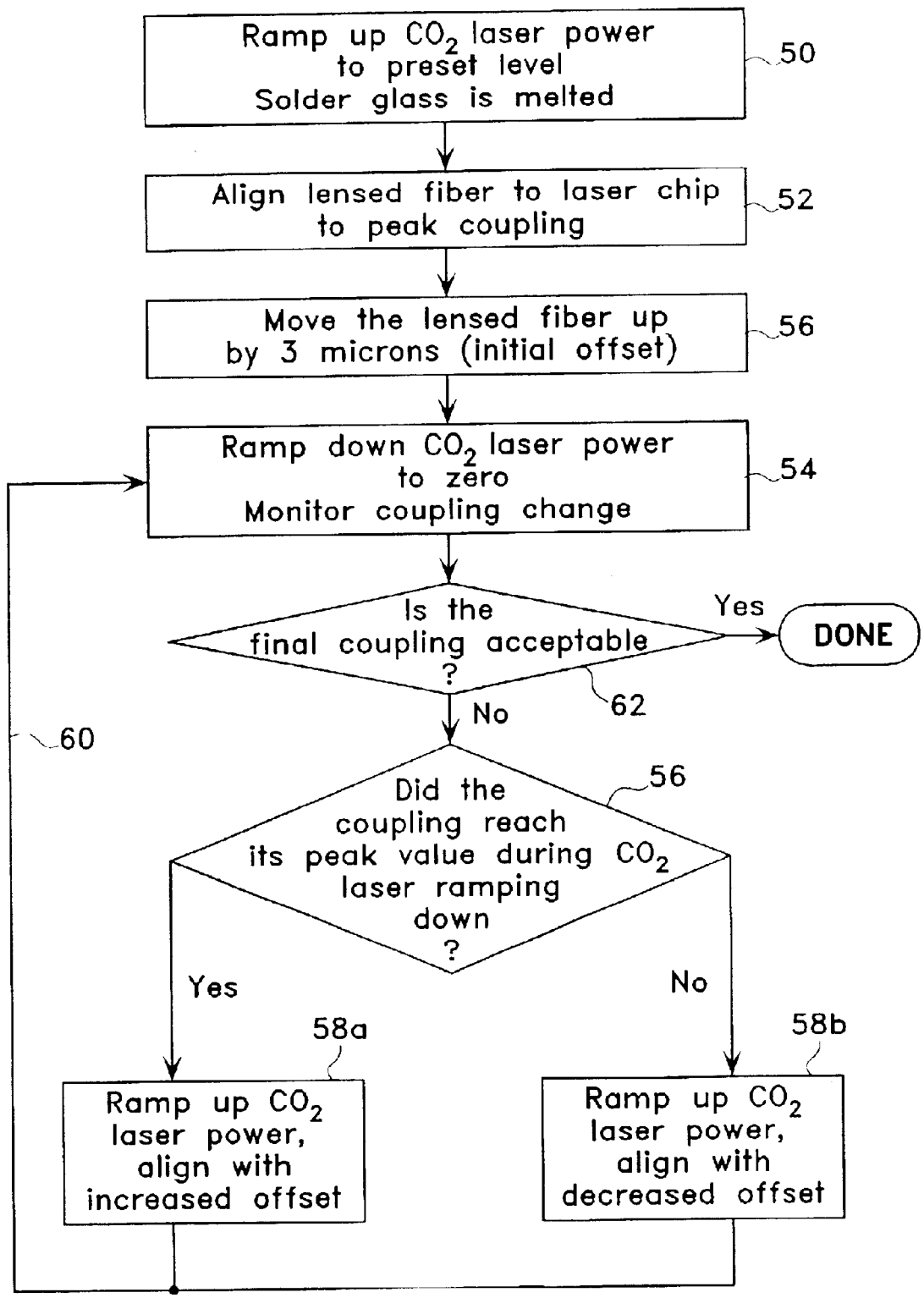

The salient characteristics, features and advantages of this invention will be apparent from the following detailed description of certain preferred embodiments and the accompanying drawings, in which:

FIG. 1 is a graph showing the effect of laser chip and lensed fiber misalignment on each of three orthogonal axes, FIG. 2 defines the axes of FIG. 1, FIG. 3 is a schematic representation of a packaged fiber optical component with an optical fiber being aligned relative to the laser, and FIG. 4 is a flowchart of an exemplary fiber alignment process.

DESCRIPTION OF INVENTION

Reference should now be made to the lensed fiber fixing station shown schematically in FIG. 3. Prior to lensed fiber alignment and fixing, all the other parts 22a, 22b in the pump laser module 20 are bonded to the package 24 with various alloy solders, of which the melting points are all below 300° C. To process the solder glass without remelting any alloy solder, we use a focused $CO_2$ laser beam 26 as the heating source and fix the lensed fiber 28 on a glass-ceramic submount 30. The $CO_2$ laser spot is adjusted to the size of the solder glass preform 32 so that the heating is only localized on the point where the fiber is jointed to the fiber submount. The glass-ceramic submount has very low thermal conductivity and can resist up to 900° C. heat, therefore, it blocks most of the heat from conducting to the other part of the package and prevents the alloy solders from remelting.

A fiber gripper 34 holds the lensed fiber and can move it with sub-micron resolution in x, y, z directions as defined in FIG. 2. The fiber gripper is angularly pre-aligned such that the fiber axis is parallel to the waveguide on the laser chip. Since the angular tolerance in fiber to laser alignment is not as tight, no further angular adjustment is necessary. The $CO_2$ laser beam 26 is focused on the solder glass preform 32 and keeps it molten (step 50, FIG. 4) during the alignment (step 52) of the lensed fiber. When the maximum coupling of the laser power is reached (detected, for example, by conventional measurement of the output end (not shown) of fiber 28, the $CO_2$ laser power is ramped down (step 52) and the solder glass solidifies. Unlike any alloy solder that has an abrupt liquid-solid phase change, the viscosity of the solder glass increases continuously as the temperature comes down. The stress in the solder glass can be relaxed and minimized if the laser ramping down rate is controlled properly.

Inevitably, the heat process will cause the solder glass to contract after solidification, which will bring the lensed fiber down (−y direction, FIG. 2) from its original position. This shift can be compensated by moving the fiber up slightly (step 56) before turning down $CO_2$ laser power. The exact amount of shift depends on the parts dimensions and process conditions, and can be determined experimentally. One can also automate this step by having the computer calculate the vertical offset based on the power-offset relation as shown on FIG. 1 (step 56) and then set the offset (steps 58a, 58b) for the next iteration (loop 60). Since the melting and solidifying of solder glass is a reversible process, one can reheat the solder glass and adjust the fiber with a revised offset (steps 58a,58b), and solidify the solder glass (step 54) repeatedly until the desired coupling is achieved (step 62). In our experience, it takes 2 to 3 trials to get the offset right and fix the lensed fiber at its peak coupling after the glass solder has solidified and cooled to its normal operating temperature. This re-workability is extremely useful when making laser modules with tight alignment tolerances.

With the above process, one can choose the solder glass and fiber submount with appropriate thermal expansion coefficients relative to that of the other components inside the module package to manage the temperature dependent chip-to-fiber coupling. One presently contemplated application of this technology is an uncooled pump laser module with reduced temperature dependent power variation.

The application of this process can be extended to many other opto-electronic components packaging where reliability, tight tolerance and re-workability are desired. The local heating source can be other laser sources or micro resistive heater printed on the fiber submount and the submount can be ceramics and glasses with high thermal resistivity and high working temperature.

What is claimed is:

1. A method for aligning an optical fiber to a laser optic module, comprising:

providing a module package with a glass ceramic submount and a laser optic module, bonding the laser optic module and the submount to the module package placing a solder glass preform adjacent the optical fiber and the submount, locally heating the solder glass preform to thereby cause molten solder glass to occupy a space between the fiber and the submount, while the solder glass preform is in a molten state, manipulating the fiber to provide a predetermined alignment between the fiber and the laser optic module, with a predetermined offset from a detected peak coupling between the fiber and the optic module.

once the fiber is in position with said predetermined offset, cooling the molten solder glass to thereby cause it to solidify while in contact with both the fiber and the submount.

2. The method of claim 1, wherein the optic module and the submount are bonded to the module package using a low melting point metal alloy solder having a melting point of less than 300° C., the localized heating the solder glass is performed using laser beam, and the thermal conductivity of the submount is sufficiently low to prevent the alloy solder from remelting when the localized heat is applied to the solder glass preform.

3. The method of claim 1, wherein the solder glass is cooled at a controlled rate that minimizes stress in the solder glass.

4. The method of claim 1, wherein the cooling causes the solder glass to contract and the fiber to shift in position relative to the submount.

5. The method of claim 4, further comprising:

observing the alignment between the fiber and the submount after the solder glass has been solidified and if the observed alignment is riot optimal:
reheating the solder glass and
again manipulating and displacing the fiber with a different predetermined offset.

* * * * *